United States Patent [19]

Elias

[11] 4,022,020

[45] May 10, 1977

[54] DEBRIS CATCHER FOR THRUST TERMINATION PORTS

[75] Inventor: Jack D. Elias, Torrance, Calif.

[73] Assignee: The United States of America as represented by the Secretary of the Air Force, Washington, D.C.

[22] Filed: Dec. 5, 1975

[21] Appl. No.: 638,210

[52] U.S. Cl. .................. 60/263; 60/254; 220/89.A; 220/371; 60/39.47

[51] Int. Cl.² .......................... F02K 9/04

[58] Field of Search ...... 60/234, 254, 229, 39.09 P, 60/39.09 R, 39.47, 39.5, 263; 55/310–314; 220/371, 372, 89 A, 89 B

[56] References Cited

UNITED STATES PATENTS

| 2,850,976 | 9/1958 | Seifert ........................... 60/254 |
| 3,182,855 | 5/1965 | Stock ............................ 220/89 A |
| 3,434,291 | 3/1969 | Friedman ....................... 60/254 |

Primary Examiner—Carlton R. Croyle
Assistant Examiner—Robert E. Garrett
Attorney, Agent, or Firm—Joseph E. Rusz; Robert G. Hilton

[57] ABSTRACT

Apparatus to reduce the degree of contamination in front of a solid propellant rocket motor following actuation of thrust termination devices. By erecting a debris catcher over the ports through which the thrust termination contamimates pass, a few large particles are permitted to flow outwardly from the catcher into the atmosphere immediately after thrust termination, while smaller particles such as might cause interference with radar observation of the rocket motor are trapped into close confinement with the casing of the spent rocket motor.

6 Claims, 7 Drawing Figures

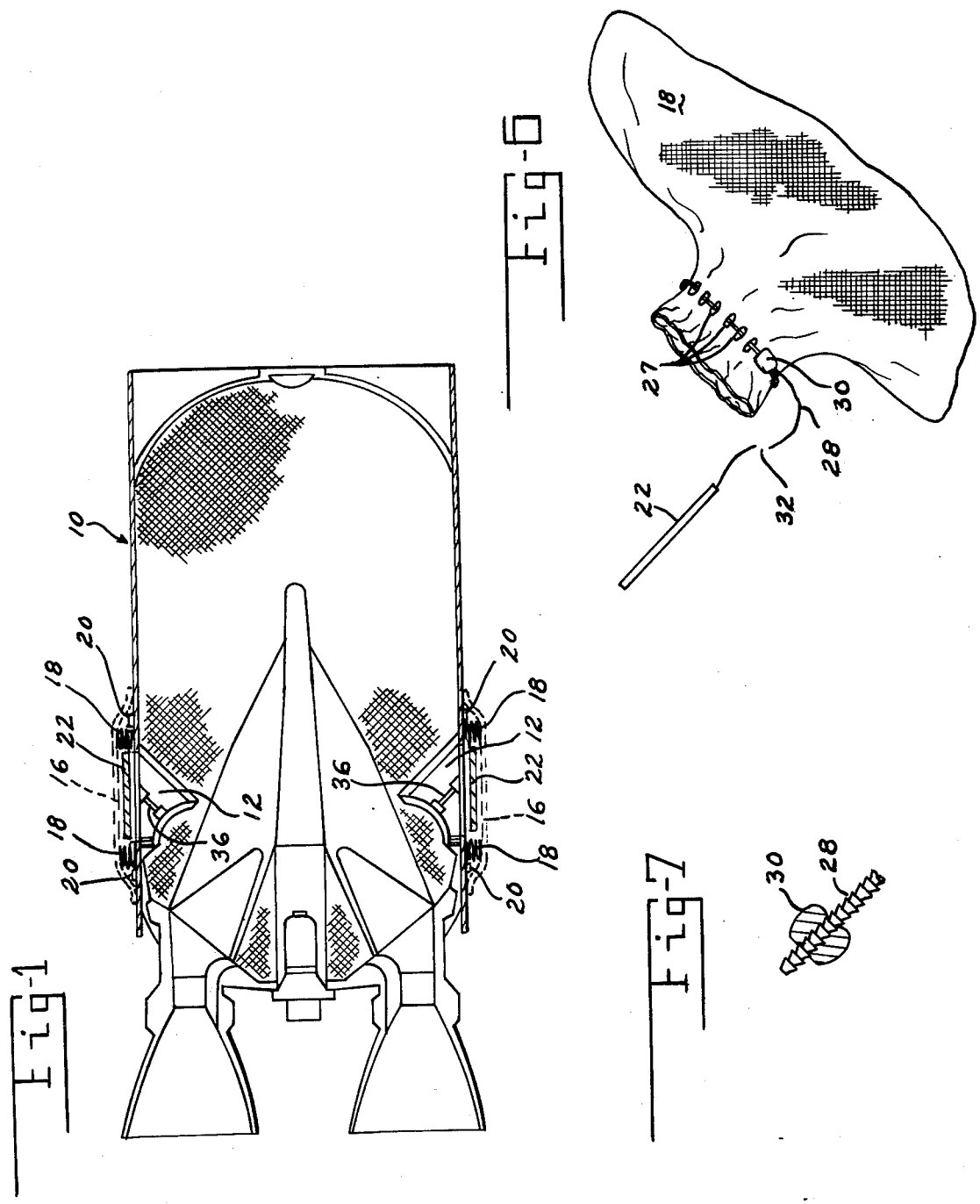

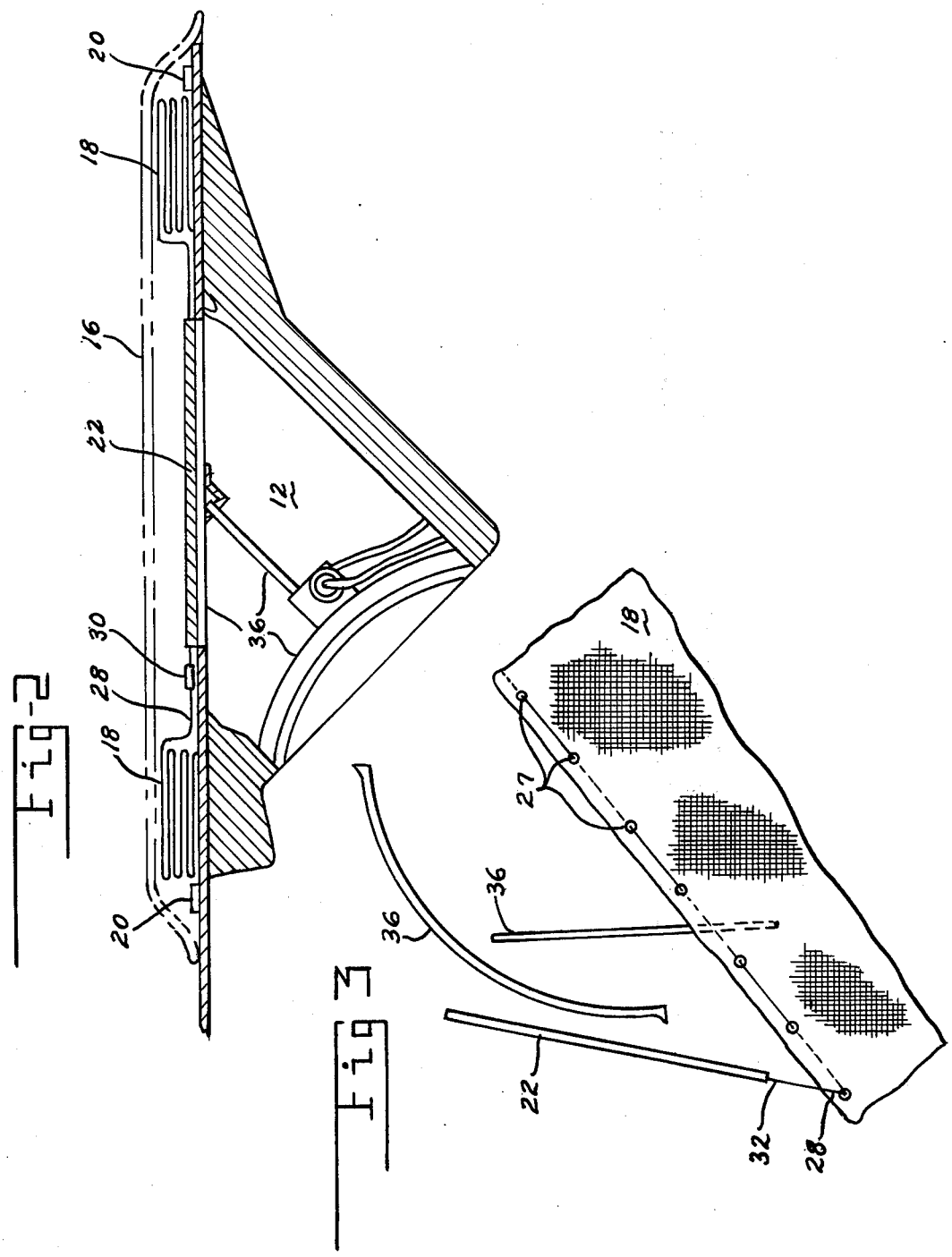

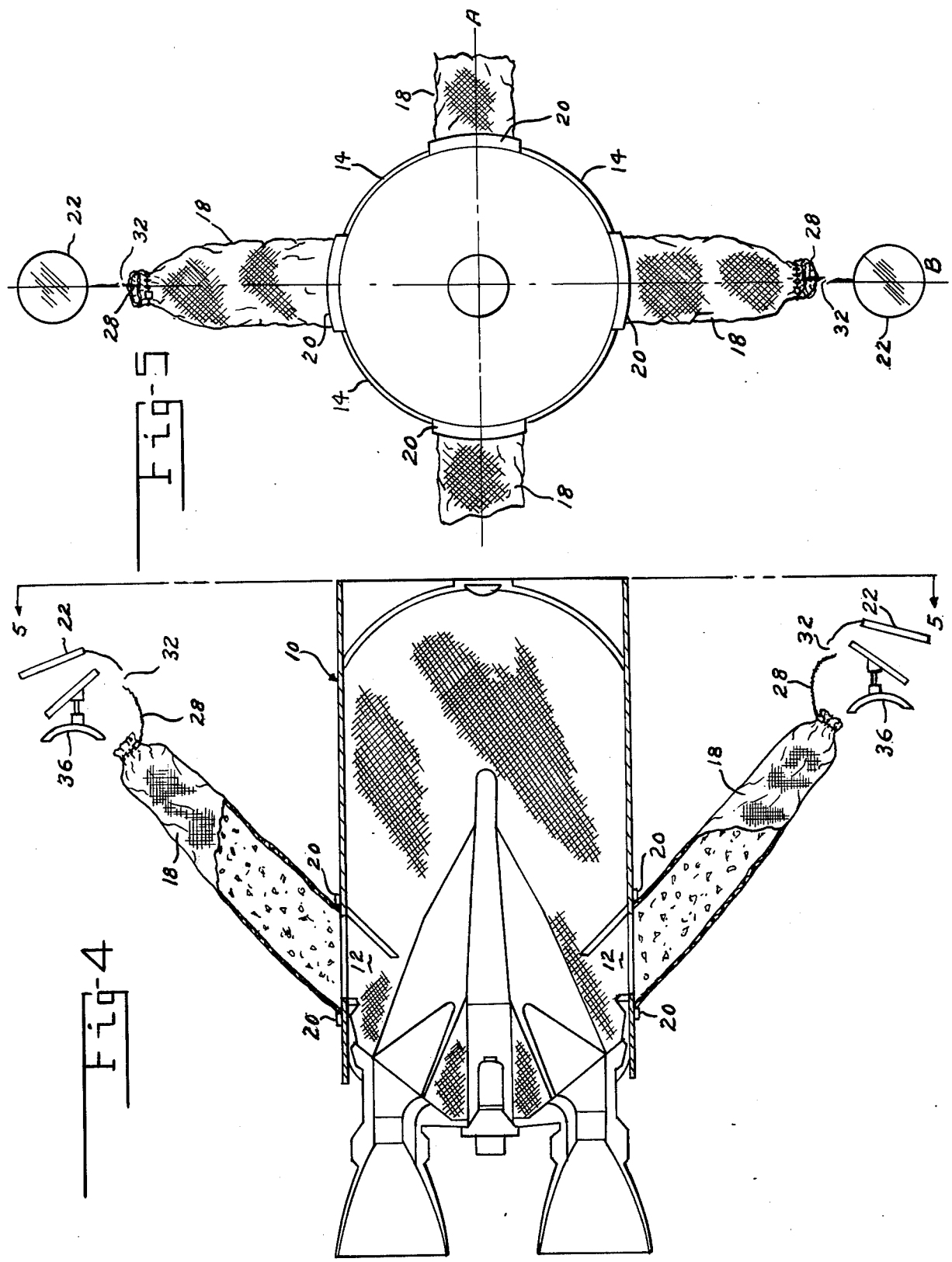

DEBRIS CATCHER FOR THRUST TERMINATION PORTS

The invention described herein may be manufactured and used by or for the Government of the United States of America for governmental purposes without the payment of any royalties thereon or therefor.

BACKGROUND OF THE INVENTION

1. Field of the Invention

The present invention relates to rocket motor engines in particular and, more specifically, the invention contemplates a device which prevents the formation in space of large conglomerate masses of debris such as are ejected from solid propellant rocket motors during the several moments immediately following termination of thrust. The invention also contemplates possible other application such as, for example, capturing debris which is contained in the main exhaust nozzle during the operation of thrust reversers, the containment of waste at the main nozzle of any reaction motor, or filtering the exhaust stream of an airborne vehicle.

2. Description of the Prior Art

Many solid propellent rocket motors employ thrust termination devices which consist of exhaust ports built into the vehicle body for the purpose of terminating the forward thrust of the motor after the motor has served its purpose of acceleration. These thrust termination ports are situated such that when they are activated, each allows emission of exhaust in a direction that has a large component opposite the direction of the main thrust of the rocket. Furthermore, these ports are sized and nozzled so that the total thrust of all thrust terminators is equal and opposite to the main thrust of the rocket. The thrust terminators are often activated by detonating explosive charges which open the port covers. Generally, the contaminates which contribute to the problem in tracking rocket motors after thrust termination has occurred will comprise certain solid portions of the exhaust ports as well as the unspent solid propellant. Thus, it is generally the case that when thrust termination devices are operated the material ejected from the rocket motor consists of both so-called hard and soft debris, such as port covers, propellant lining, propellant pieces, and any eroded hardware. Debris thus ejected from the rocket motor has been known to develop into a sizeable particulate cloud many miles in diameter and length when measured in terms of its radar cross section. The disadvantage of formation of clouds of this kind is that they frequently interfere with precise tracking of a missile because tracking stations are not able to clearly distinguish between the rocket motor itself and the particulate cloud formation.

Prior to the present invention, it was known to place porous bags over the exhaust pipes of land-borne motor vehicles to prevent the discharge of unwanted particles into the atmosphere. Furthermore, it was also known to install rigid grills over the exhaust ports of airborne vehicles for the purpose of preventing any untimely discharge into space of some exhaust contaminates. Additionally, vacuum cleaner devices have been designed which force expelled air to be exhausted in a downward direction in order to lessen the amount of weight which is resting on the floor, with a porous debris catcher being installed inside the vacuum cleaner to prevent any dust from being ejected into the atmosphere. These devices, although having some advantage in the particular uses to which they have been applied, are not suitable for application to the ports of rocket motors which have the firing cycle terminated by the initiation of charges which open the thrust termination ports. The novel debris catcher device of the present invention overcomes the difficulties of the prior art and has several additional advantages as will hereinafter be described.

SUMMARY OF THE INVENTION

The present invention comprises essentially a container placed in cooperative arrangement with the thrust termination ports of a rocket motor body. The container may be constructed of wire or other suitable material having a mesh which prevents undesirable debris from entering the atmosphere upon the actuation of the thrust termination cycle, but allows gaseous molecules to pass freely through it.

Accordingly, one object of this invention is to provide a contaminate entrapment device for preventing the accumulation in space of debris from a reaction motor upon initiation of the thrust termination devices.

Another object of the invention is to provide a contaminate entrapment apparatus which can conveniently be installed upon existing rocket motor designs without requiring major structural changes.

A further object of the invention is to provide a catcher for the debris of a thrust termination device which is unfurled at the moment of thrust termination accuation to a position which effectively confines undesirable propellant products to a definite area.

Still a further object of the invention is to provide a debris catcher which, when integrated and unified with a rocket motor body is simple, stable, compact, and relatively inexpensive.

Other objects and advantages of this invention will readily be appreciated from the following description, when taken in connection with the accompanying drawings, wherein:

FIG. 1 is a longitudinal section of a rocket motor showing thrust termination debris catchers embodying my invention when applied to two of its thrust termination ports;

FIG. 2 is a detailed section of the debris catcher embodying the present invention when applied to the thrust termination port in a folded condition as it appear prior to deployment;

FIG. 3 is a detailed section of the outermost portion of a debris catcher of the present invention as shown during the process of deployment;

FIG. 4 is a longitudinal section of the rocket motor embodying debris catchers after full deployment, depicting partial cross section of the debris catcher;

FIG. 5 is a view of the rocket motor taken along the line 5—5 of FIG. 4;

FIG. 6 is a side view of the outermost portion of the debris catcher of the present invention showing more specifically the operation of sealing the one end of the bag at the moment of final deployment; and FIG. 7 is a section of the tether cable and its cooperative arrangement with the one way restraining ring for sealing the neck of the debris catcher bag.

Referring now to the drawings, in which similar reference characters refer to similar parts in each of the several views, there is shown in FIG. 1 a conventional solid propellant rocket motor generally referenced 10, having thrust termination ports 12 evenly spaced in an equiangular relationship in a plane transverse to the direction of travel of the rocket motor 10. In the preferred embodiment, four thrust termination ports 12, only two of which are shown in FIG. 1, are arranged at the extremities of two intersecting axes A and B as more specifically shown in FIG. 5. The direction of thrust of rocket motor 10 is to the left as viewed in FIG. 1, and the arrangement and composition of the major operative parts of the rocket motor is believed to be so well known in the art that no detailed description of the function of the rocket motor 10 is deemed necessary herein.

In FIG. 2, the components associated with an individual thrust termination port of the kind found in the rocket motor 10 are shown more clearly with a view to describing the preferred arrangement of the manner in which the debris catcher of the invention is placed in cooperative arrangement with the port of the rocket motor. With a view toward specifically illustrating the physical configuration of the debris catcher when not in use, there is shown in FIG. 2 an aerodynamic cover 16 of disc like configuration which covers the entire thrust termination port assembly 12. This cover is preferably made of insulating material which has low fracture strength and which will fracture after actuation of the thrust termination port. One function of the cover 16 is to prevent any frictional heating of the ports during forward flight of the rocket motor. A flexible and foldable tubular container 18 is initially placed over the port with both of its ends open and conveniently folded over the thrust termination port 12 and beneath the cover 16. The container 18 may be of wire mesh or any similar material which restrains the movement of particulate mass but allows the free passage of gaseous mass. A container so constructed is herein characterized as a porous container. The container 18 at the one or bottom end thereof is secured to the rocket motor by means, for example, of a hold down frame 20 which is annular in form and has a curvature intended to conform to the surface of the cylindrical rocket motor housing 10. Optionally, interconnecting straps 14 may be installed along the outer surface of the rocket motor 10, the two ends of each strap 14 being securedly fastened to adjacent hold down frames 20 (FIG. 5). These straps 14 provide additional support for the hold down frames 20 during thrust termination. Placed within the foldable container 18 is an impact plate 22 which may be disc-like in configuration. As further shown in FIG. 2, the other or outward end of the container 18 is folded over so that its folds extend from its outermost boundary into close proximity with the edge of the plate 22. Nearest to the plate 22, the neck of the container is provided at its periphery with a plurality of loops or grommets 27 (FIG. 3 and FIG. 6). A tethered line or cable 28 has one end fixedly attached to the impact plate 22 by any suitable attaching means not shown. The line or cable 28 passes through the loops or grommets 27. Between the cover plate 22 and the loops or grommets 27 said line or cable 28 passes through a one way cable lock retainer ring 30 (FIG. 7). The remaining or free end of the line or cable 28 is securedly attached to the retainer ring 30. As will be described hereinafter, the line 28 has the function of drawing the periphery of the container 18 into a tight circle once the final deployment is complete. For the purpose of insuring that the container, once drawn closed, is unable to open, the retainer ring 30 secures the container closed. No reciprocal movement of ring 30 can occur. It is also preferred in the invention embodiment to weaken the line 28 by making a slightly smaller cross section at one point along its length, such as at point 32, (FIG. 3) which is located adjacent the point of attachment of the line 28 and impact plate 22, this same point being shown in FIG. 5. As will hereinafter be seen, once the container 18 is fully extended, the weakened section of line 28 allows the cable to snap at Point 32 thereby permitting the impact plate 22 to separate completely from the rocket motor body 10 leaving the container 18 with its neck firmly closed.

Also located in the thrust termination port 12, between the impact plate 22 and the solid propellant and internal elements of the rocket motor body 10, is a thrust terminator activation assembly at 36 typically composed of, as herein shown, a rod having its one end secured to the thrust termination port cover so as to "blow" the cover at the moment when thrust termination of the rocket motor is desired. The activation assembly 36 can be fabricated from any suitable material adapted to withstand pressures from the cover plate 22 and, preferably, in a manner well understood by those skilled in the art, it is employed to rupture the thrust termination port opening at the initiation of a suitable signal calling for operation of the rocket motor to cease.

FIGS. 3, 4, 5 and 6 depict the operation of the thrust termination device embodying the invention during deployment of the container 18. In operation, the activation assembly 36 strikes the impact plate 22 propelling it against the cover 16 causing said cover 16 to fracture, and allowing both the activation assembly 36 and the impact plate 22 to eject immediately through the vacant space while the outer end of container 18 is still wide open. The activation assembly 36, impact plate 22 and debris from cover 16 will move away promptly from the rocket motor 10 immediately upon initiation of the signal which results in the actuation of the assembly 36. Such larger and more solid articles have been found not to have any aggravating character on the nature of the tracking signal returned to the ground tracking station because of their size. They can be identified and isolated at discrete points by the radar and thus will not interfere with any tracking of a vehicle powered by the rocket motor 10. Furthermore, in view of present state of the art, it would be extremely impractical to attempt to restrain these large pieces of debris.

In the act of moving away from the rocket motor 10 the impact plate 22, secured at one end thereof to the line 28, exerts a force on the cable which draws the neck of the container 18 tight with the result that upon full deployment of the bag, the container is secured at one end thereof to the rocket motor by virtue of the hold down frame 20, and the other end is drawn tight so that the neck of the container is closed. After the container 18 is closed to eggress of any contaminates moving therethrough, the difference in velocities between impact plate 22 and rocket motor 10 causes the line 28, at its weakened point 32, to break. This frees the impact plate 22 from further confinement with the rocket motor and allows it to pass into the atmosphere along with the other previously ejected items, namely the actuation device 36 and debris from aerodynamic cover 16. The balance of the particulate contamination products is captured by the container and entrapped therein. Because of the one way operation of the retaining ring 30, no reopening of the container is possible.

As previously indicated, it is one of the features of the invention that the container is preferably in the form of a mesh bag which has a mesh sized to prevent particles above a certain size from passing therethrough. Such a bag, according to present technology, would probably be constructed of a fire or heat resistant wire; furthermore, said wires may be coated with a nonflammable substance. It should, however, be understood that future advances of technology may enable materials other than those of a metallurgical quality to be used as the debris-capturing element. At present, it is comtemplated that the wires of container 18 can be layered with a plastic material such as asbestos-filled "Teflon" which will protect the wire from any burning or ignited gases emanating from the trapped solid propellant.

Various other modifications are contemplated and may be resorted to by those skilled in the art without departing from the spirit and scope of the invention as hereinafter defined by the appended claims.

What I claim is:

1. In combination with a reaction motor having at least one exhaust port, a debris catcher comprised of: a porous container with first and second openings opposite each other, means attached to the edge of the first opening for securing the edge of the opening to the reaction motor outside and encircling the exhaust port, and a means attached to the edge of the second opening for closing the second opening.

2. A debris catcher as defined in claim 1, wherein the porous container is folded and which is further comprised of a means for unfolding said container during activation of the exhaust port.

3. A debris catcher as defined in claim 2, further comprised of a shield attached to the reaction motor so that the shield and reaction motor together completely surround the porous container, for protecting said porous container prior to activation of the exhaust port.

4. A debris catcher as defined in claim 3, wherein the shield is sufficiently frangible that activation of the exhaust port will cause said shield to break.

5. A debris catcher as defined in claim 1, wherein the reaction motor is a rocket motor which contains a thrust termination port, and wherein the exhaust port around which the container is placed is the thrust termination port.

6. In combination with a rocket motor having a thrust termination port, a debris catcher comprising, a collapsible porous container having an opening at one end, means attached to the edge of said container defining said opening for positioning said edge of said container about said thrust termination port, a removable shield attached to said rocket motor, said shield encasing said collapsible porous container in its collapsed state for protecting said porous container piror to utilization of said thrust termination port; and means for removing said shield permitting said container to expand upon initial utilization of said thrust termination port.

* * * * *